United States Patent [19]

Lund et al.

[11] Patent Number: 4,470,498

[45] Date of Patent: Sep. 11, 1984

[54] APPARATUS FOR MAKING CONTINUOUS LENGTHS OF COMPOSITE WOOD MATERIAL, THE APPARATUS INCLUDING ROTATING CIRCULAR BAFFLES

[75] Inventors: Anders E. Lund, Houghton; Gordon P. Krueger, Hancock; Bruce A. Haataja, Lake Linden; Roy D. Adams, Houghton, all of Mich.

[73] Assignee: Board of Control of Michigan Technological University, Houghton, Mich.

[21] Appl. No.: 365,619

[22] Filed: Apr. 5, 1982

[51] Int. Cl.³ .............................................. B65G 47/24

[52] U.S. Cl. .................................... 198/382; 425/83.1

[58] Field of Search ............... 198/611, 445, 628, 382, 198/532, 569, 626; 425/83.1, 82.1, 81.1; 264/24, 108

[56] References Cited

U.S. PATENT DOCUMENTS 3,896,536 7/1975 Keller et al. .................... 198/382 X
4,074,807 2/1978 Goulds ............................ 198/445 X

FOREIGN PATENT DOCUMENTS 1363455 5/1963 France ................................ 198/611
215105 3/1963 Sweden ............................... 198/626

*Primary Examiner*—Joseph E. Valenza
*Assistant Examiner*—Dennis J. Williamson

[57] ABSTRACT

Apparatus for forming an elongated loosely felted mat of thin elongated wood flakes with the flakes being aligned in mutually parallel relation and being aligned with the longitudinal direction of the elongated mat. The apparatus comprises a plurality of conveyor belts positioned in closely adjacent side-by-side relation and defining a mat supporting surface adapted to support the aligned wood flakes, the belts being supported on the surface of a cylinder. Wood flakes are deposited in loosely felted relation on the belts, and a plurality of closely spaced parallel planar baffles surround the cylinder, the baffles comprising plates positioned between the belts and functioning to cause alignment of the flakes as they are deposited on the belts. The mat is compressed against the supporting surface by a plurality of belts positioned in adjacent side-by-side relation, the belts being positionable between the baffles and engageable against the mat.

3 Claims, 2 Drawing Figures

APPARATUS FOR MAKING CONTINUOUS LENGTHS OF COMPOSITE WOOD MATERIAL, THE APPARATUS INCLUDING ROTATING CIRCULAR BAFFLES

FIELD OF THE INVENTION

The present invention relates to the production of composite wood or compressed wood particle products and to methods and apparatus for forming a mat of wood particles to be compressed.

BACKGROUND PRIOR ART

As set forth in the Lund et al. U.S. Pat. No. 4,241,133, issued Dec. 23, 1980 and assigned to the assignee of the present invention, it has been found to be desirable in the construction of compressed or composite wood particle products to employ wood flakes which are very thin and which have a length at least several times their width and to align the wood flakes in mutually parallel alignment and in alignment with the longitudinal axis of the product being produced. This produces a product having substantially improved strength characteristics in the direction of alignment of the wood flakes. The production of such compressed wood products formed from an assembly of wood particles first requires the formation of a loosely felted mat of wood particles. The mat is then compressed to form a densified panel or board. One problem encountered in forming the loosely felted mat is that the alignment or orientation of the elongated wood flakes is made difficult because the wood flakes, which are very light and comparatively fragile, have to be handled en masse, and this has resulted in the clogging of the known machines that were tried for this purpose. Additionally, it has been difficult to produce mats of uniform thickness using prior art machines Another problem in connection with handling and orienting the wood flakes has been that the flakes tend to be randomly oriented as they fall onto the mat and must be held in alignment as they are deposited.

Examples of prior art attempts to design suitable apparatus for forming mats of aligned wood strands are set forth in the Elmendorf U.S. Pat. No. 3,478,861, issued Nov. 18, 1969; the Elmendorf U.S. Pat. No. 3,220,743, issued Aug. 24, 1965; the Turner et al. U.S. Pat. No. 3,721,329, issued Mar. 30, 1973; the Urmanov U.S. Pat. No. 3,963,400, issued June 15, 1976; and Canadian Patent No. 597,941, issued May 10, 1960.

Attention is also directed to the Hostettler U.S. Pat. No. 3,226,764, issued June 4, 1966; the Hostettler U.S. Pat. No. 3,070,838, issued Jan. 1, 1963; the Carlsson et al. U.S. Pat. No. 3,692,612, issued Sept. 19, 1972; the Paerels et al. U.S. Pat. No. 3,372,217, issued Mar. 5, 1968; the Axer et al. U.S. Pat. No. 3,824,058, issued July 16, 1974; and the Chapman U.S. Pat. No. 2,992,152, issued July 11, 1961.

SUMMARY OF THE INVENTION

The invention includes apparatus for forming an elongated continuous mat of elongated wood flakes mixed with a binder and adapted to be compressed to form a densified composite wood product. The apparatus of the invention includes a means for providing a continuously moving mat supporting surface and means for continuously depositing wood flakes on that supporting surface Means are also provided for aligning the elongated wood flakes in mutually parallel relation and in alignment with the direction of movement of the supporting surface, the means for aligning including a plurality of closely spaced parallel baffles, the baffles being curved and following the curve of the supporting surface. Means are also provided for compressing the elongated wood flakes in the mat and for pressing the mat against the supporting surface, the means for pressing including a plurality of belts positioned in side-by-side parallel relation and including flight portions engageable with the mat and having a curve following the contour of the opposed curved supporting surface.

More particularly, the invention includes apparatus for forming an elongated loosely felted mat of thin elongated wood flakes with the flakes being aligned in mutually parallel relation and being aligned with the longitudinal direction of the elongated mat. The apparatus includes means defining a mat supporting surface, the mat supporting surface being continuously moving and being adapted to support the aligned wood flakes, and means for depositing wood flakes on the supporting surface. The apparatus also includes means positioned between the supporting surface and the means for depositing and for aligning the wood flakes as they are deposited on the supporting surface the aligning means including a plurality of parallel planar baffles, the baffles comprising circular plates, at least a portion of the plates projecting radially outwardly from the supporting surface, and means are also provided for compressing the mat against the supporting surface, this means including a plurality of belts positioned in adjacent side-by-side relation, the belts being positionable between the baffles and engageable against the mat.

In one embodiment of the invention the mat supporting surface is defined by a plurality of belts, respective ones of the belts being positioned between pairs of the baffles, and the belts are supported on the surface of a cylindrical member and the baffles comprise plates extending outwardly from the surface of the cylindrical member.

One of the primary advantages of the invention is that it provides a means for forming a mat wherein the alignment of the flakes is maintained as the mat is built up. In the illustrated structure embodying the invention, the flakes are retained in the baffle system while the mat depth is being built up, and the flakes are not permitted to become misaligned. Then the entire mat is precompressed and discharged from the baffle system as a coherent, aligned, continuum.

Various other features and advantages of the invention will be apparent from the following description of a preferred embodiment, from the claims, and from the drawings.

Figure 1:
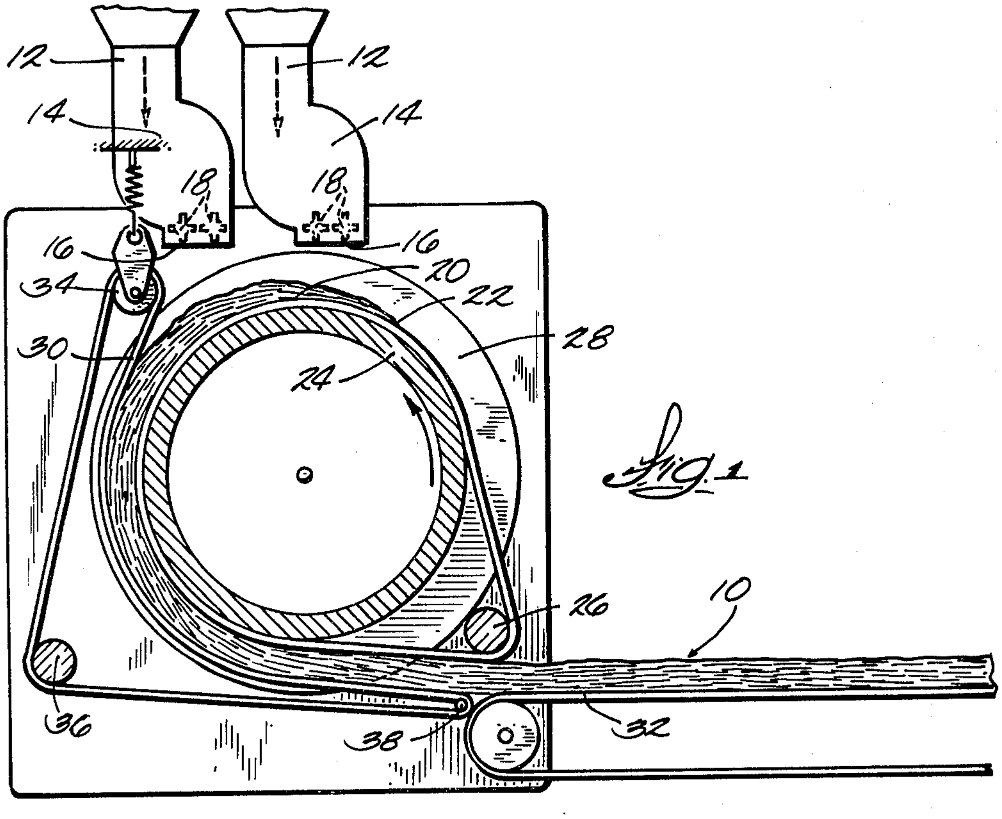
FIG. 1 is a side elevation view, and with portions broken away, of apparatus embodying the present invention and for forming a loosely felted mat of aligned wood flakes.
Figure 2:
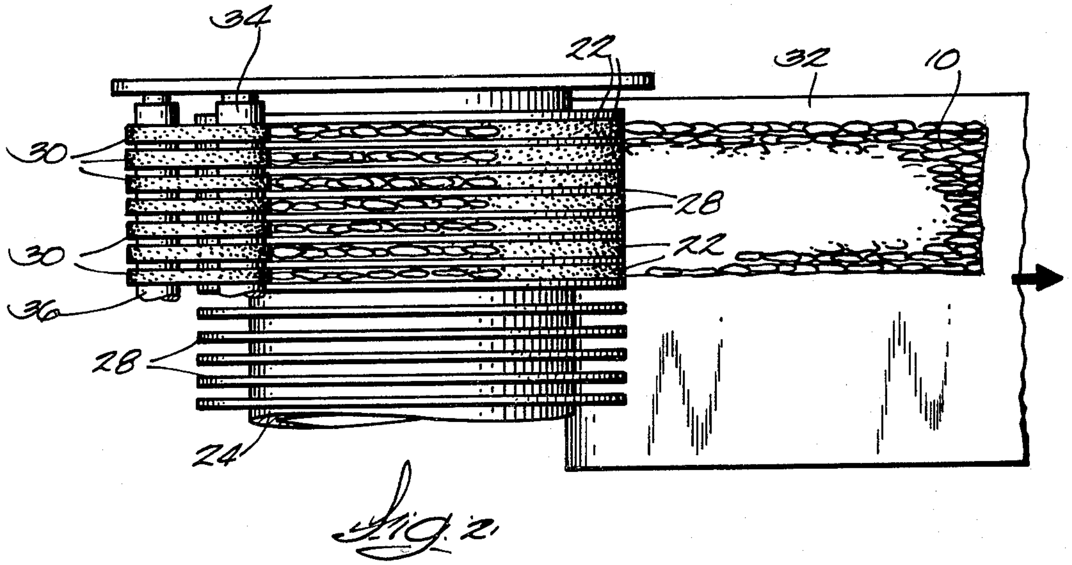
FIG. 2 is a plan view of a portion of the apparatus illustrated in FIG. 1.

Before describing a preferred embodiment of the invention in detail, it is to be understood that the invention is not limited in its application to the details of construction nor to the arrangement of the components set forth in the following description or illustrated in the drawings The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an apparatus for forming an elongated continuous loosely felted mat 10 comprised of elongated wood flakes and a binder, this mat 10 being adapted to be placed in a press and to be compressed therein to form a densified composite wood product such as is illustrated, for purposes of example, in the Lund et al. U.S. Pat. No. 4,241,133.

The apparatus illustrated in FIG. 1 includes a means for depositing a furnish comprised of a mixture of elongated wood flakes and a binder onto a supporting surface as the supporting surface moves continuously beneath the means for depositing and thereby forms a loosely felted mat of flakes on the supporting surface. In the preferred embodiment, the furnish is comprised of a mixture of wood flakes and a binder material as set forth in the Lund et al. U.S. patent referred to above. It is preferred that the flakes be oriented in the loosely felted mat in mutually parallel relation and in parallel relation to the longitudinal axis of the product to be formed to thereby produce a compressed wood product having improved strength characteristics. Additionally, it is preferred that the wood flakes of the furnish should have an average length of about 0.5 inch to about 3.5 inches, and preferably about 1 inch to about 2 inches, and an average thickness of about 0.01 to about 0.05 inch. Flakes longer than about 3.5 inches tend to curl and this hinders proper alignment of the flakes during the formation of a mat. It is also difficult to insure that flakes shorter than about 0.5 inch to not become aligned with their grain direction crosswise. Flakes thinner than about 0.01 inch tend to require excessive amounts of binder to be mixed with these flakes if an adequate bonding of the flakes is to occur. Flakes thicker than about 0.05 inch are relatively stiff and tend to require excessive compression in order to obtain the desired intimate contact therebetween. In any given batch, some of the flakes can be shorter than 0.5 inch and some can be longer than 3.5 inches so long as the overall average length of the flakes is within the above range. The same is true for the thickness. To facilitate proper alignment of the flakes, it is preferred that the flakes should have a length which is several times the width and preferably about 4 to about 10 times. Using this constraint as a guide, the average width of the flakes generally should be about 0.1 to 0.5 inches.

The furnish is formed by introducing flakes of the size that is described above into a conventional blender wherein predetermined amounts of a binder are applied to the flakes as they are tumbled or agitated in the blender. Suitable binders include those used in the manufacture of particleboard and similar pressed particle products. Such binders may include organic polyisocyanates including those curable at room temperature or urea formaldehyde.

Referring again to the means for depositing the furnish onto the supporting surface, it is preferred that it deposit the elongated flakes in an evenly distributed relation as the supporting surface moves beneath the means for depositing to thereby build up a mat of the desired thickness which has a uniform concentration of flakes.

While the means for depositing can have various constructions, in the illustrated arrangement it includes a pair of formers 12 of the type employed to dispurse wood flakes in the manufacture of particleboard or chipboard. More particularly, the formers 12 each include a hopper 14 adapted to contain a quantity of furnish, each hopper 14 including an opening 16 in its bottom wall. Rotating picker rolls 18 are mounted in that opening 16 to break up clumps of flakes, to evenly dispurse the wood flakes onto the supporting surface 20, and to control the amount of flakes being deposited on the supporting surface 20.

Referring more particularly to the apparatus for forming the supporting surface 20 on which the continuous loosely felted mat of wood flakes is formed, that means includes a plurality of narrow, flexible conveyor belts 22 which are positioned in side-by-side closely spaced adjacent relation, the belts 22 being supported by a large diameter cylindrical member 24 and by a roller 26. In the illustrated construction, the cylindrical member is comprised of a cylindrical drum. In other embodiments it could be comprised, for purposes of example, of a plurality of plywood discs sandwiched together. In the particular construction illustrated, the drum 24 is hollow and rotates about a horizontal axis, and the drum 24 is of sufficient size that the portions of the belts 22 which are supported on the upper surface portion of the drum form a curved but somewhat horizontal forming surface 20 adapted to support the wood flakes deposited by the formers 12.

Means are also provided for causing continuous and relatively slow rotation of the drum 24 and continuous movement of the conveyor belts 22 beneath the means for depositing the wood flakes. This drive means could comprise a variety of conventional arrangements, and as an example, it could include a motor connected by reduction gears to the roller 26 for rotatably driving the roller in the counterclockwise direction as viewed in FIG. 1.

The apparatus embodying the invention also includes means for aligning the elongated wood flakes as they are deposited onto the forming surface 20 such that the flakes are in mutually parallel alignment and parallel to the direction of movement of the supporting surface 20. The means for aligning the wood flakes includes a plurality of generally circular baffles 28 supported by the surface of the cylindrical drum 24 and positioned in closely adjacent parallel side-by-side relation. More particularly, the baffles 28 are supported such that they define planes perpendicular to the axis of rotation of the drum 24, and they are spaced apart by a dimension slightly greater than the width of the flakes such that the flakes can fall between the baffles 28 onto the belts making up the supporting surface 20. On the other hand, the baffles 28 are sufficiently closely spaced that the flakes falling between the baffles will be held in substantially parallel alignment and in alignment parallel to the planes defined by the baffles. the thickness of the baffles 28 is exaggerated in the drawings for convenience of illustration.

While the means for supporting the baffles 28 can have various constructions, in the illustrated arrangement, the baffles 28 comprise sheet metal plates defining planes perpendicular to the axis of rotation of the drum 24 and surrounding the drum. In the illustrated arrangement, the baffles are fixedly joined to the drum and extend radially outwardly from the surface of the drum 24.

It should also be noted that the baffles 28 are spaced apart by a distance substantially equal to the widths of the individual belts 22 making up the forming surface. In the illustrated construction each belt is positioned between pairs of the baffles 28 and extends across the entire distance between the baffles.

In operation of the apparatus described above, as the conveyor belts 22 forming the supporting surface move under the formers 12, the wood flakes deposited by the formers 12 will tend to become aligned with the baffles 28 and fall between the baffles onto the supporting surface formed by the belts 22. As the flakes fall from the formers 12 and between the baffles 28 they will tend to assume a horizontal position and they will form a loosely felted mat 10 with the flakes all lying in generally horizontal planes and with the flakes being interleaved one with another. As the supporting surface moves under the formers 12, the thickness of the mat builds up to that desired. It has been found to be convenient to construct the apparatus described above such that the baffles project radially outwardly from the surface of the drum a distance of approximately 3 inches such that a mat having a thickness of up to nearly three inches could be formed.

It should also be understood that the drum supporting the belt 22 is of sufficient size that the upper portion of the drum 24 provides a generally horizontal supporting surface and that the portion of the supporting surface beneath the formers is of sufficient length that a mat of the desired thickness is built up as the supporting surface moves continuously beneath the formers. For example, in a construction as described above wherein the mat produced may have a thickness of 3 inches it is convenient to employ a drum 24 having a diameter of approximately 24 inches.

Means are also provided for compressing the mat as the supporting surface 20 moves beneath the formers 12 and for forcing the mat against the supporting surface. This means includes a means for forcing any flakes lying across the baffles 28 to become aligned with the baffles 28 and to be forced against the mat. In the illustrated construction this means comprises a plurality of closely adjacent conveyor belts 30, the belts 30 each having a width substantially the same as that of belts 22, and the belts 30 being in opposed relationships to the belts 22 so as to be movable between the baffles 28 to engage the mat. Generally, the conveyor belts 22 and 30 are arranged such that the mat is compressed as the drum 24 rotates from the position wherein the formers 12 deposit wood flakes on the forming surface through an arc of approximately 120°. At the bottom of the drum 24 the belts 22 and 30 extend generally horizontally and at a tangent to the curved surface of the drum 24 to thereby pull the mat away from the surface of the drum and the baffles. Since the portions of the mat 10 in this area are held between the belts 22 and 30, the flakes are not permitted misalignment as the mat is pulled away from between the baffles 28 The belts 22 and 30 carry the mat away from the surface of the drum 24 toward a conveyor belt 32, the conveyor belt 32 being adapted to carry the mat 10 to a press where the mat can be compressed to form a densified composite wood product.

Referring more particularly to the particular structure illustrated in the drawing as comprising the means for compressing the flakes and for forcing the mat against the supporting surface formed by belts 22, the parallel side-by-side conveyor belts 30 are supported by three rollers or shafts 34, 36 and 38, the rollers 34, 36 and 38 being spaced apart in a triangular arrangement. The roller 34 is positioned adjacent the formers 12 and is rotatable about a horizontal axis parallel to the axis of rotation of the drum 24. The roller 38 is positioned adjacent a lower portion of the drum and adjacent the roller 26 supporting the conveyor belts 22. The rollers 34 and 38 are positioned on opposite sides of the drum 24 such that a plane including the axis of each of the rollers 34 and 38 generally bisects the drum. Also included is a third roller 36 positioned between the rollers 34 and 38 and spaced outwardly from the surface of the drum 24. Means are also provided for resiliently biasing the roller 34 upwardly to thereby generate tension on the belts 30 tending to force those portions of the belts 30 positioned in opposed relation to the belts 22 against belts 22 to compress the mat and to force the mat against the supporting surface.

Various features of the invention are set forth in the following claims.

We claim:

1. An apparatus for forming an elongated loosely felted mat of thin elongated wood flakes with said flakes being aligned in mutually parallel relation and being aligned with the longitudinal direction of the elongated mat, said apparatus comprising
   - a cylindrical drum, said cylindrical drum including an external cylindrical surface,
   - a belt supporting member spaced from said cylindrical drum,
   - means defining a continuously moving mat supporting surface adapted to support the aligned wood flakes thereon. said mat supporting surface including a first plurality of conveyor belts in parallel side-by-side adjacent relationship and reeved around said cylindrical drum and said belt supporting member such that each of said belts includes a first portion supported on an upper surface portion of said drum and for receiving wood flakes thereon, a second portion extending around a portion of said drum, and a third portion extending tangentially away from a lower surface portion of said drum and around said belt supporting member.
   - means for depositing wood flakes on said first portion of said belts, said depositing means being positioned above said first portion of said belts.
   - means for aligning said wood flakes as said wood flakes are deposited on said belts, said aligning means including a plurality of thin parallel planar baffles positioned such that respective ones of said belts are positioned between pairs of said baffles, said baffles comprising circular plates rigidly supported by said cylindrical drum such that said plates are perpendicular to the longitudinal axis of said drum, with each of said plates having at least a portion thereof projecting from said belts, and said baffles being extremely thin so as to provide a mat of uniform density across the width of the mat, and
   - means for holding said mat between said baffles and against said belts. said means for holding including a second plurality of belts positioned in adjacent side-by-side relation and being positionable between said baffles and engageable against said mat and coacting with said belts forming said supporting surface.

2. An apparatus as set forth in claim 1 and further including conveyor means for conveying the loosely felted mat from said supporting surface, said means for conveying including a conveyor belt having opposite ends, one of said ends being positioned adjacent said third portions of said belts for receiving the loosely felted mat formed on said supporting surface.

3. An apparatus as set forth in claim 1 and further including means for causing tension on said second plurality of belts such that said mat is compressed between said first and second pluralities of belts.

* * * * *